Sept. 12, 1950  A. M. FELLER  2,521,905
TORQUE AND SPEED INDICATOR
Filed Feb. 14, 1945  2 Sheets-Sheet 1

INVENTOR.
*Anton M. Feller,*
BY
*Edward L. Mueller*
ATTORNEY

Sept. 12, 1950  A. M. FELLER  2,521,905
TORQUE AND SPEED INDICATOR
Filed Feb. 14, 1945  2 Sheets-Sheet 2
*Fig. 5.*
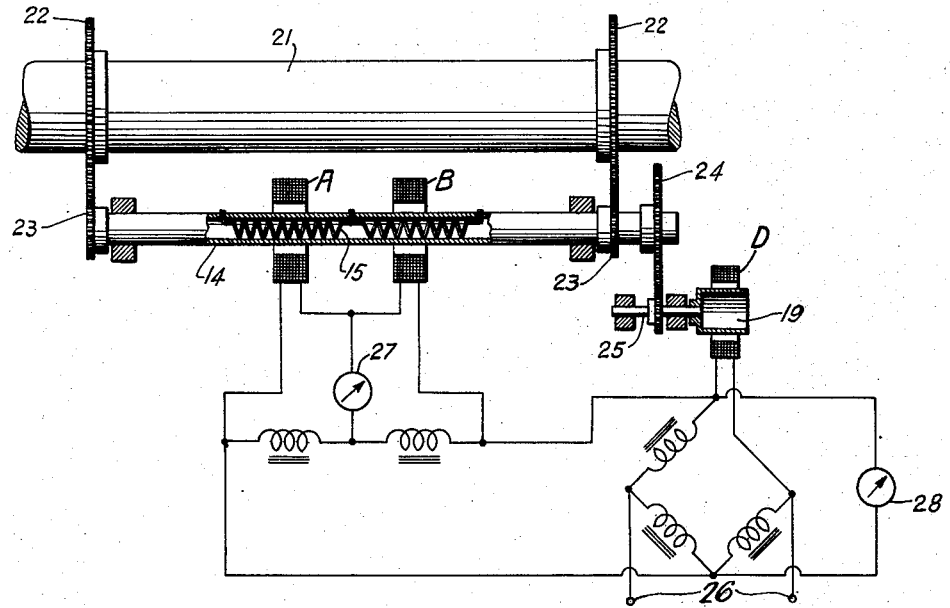
*Fig. 7.*
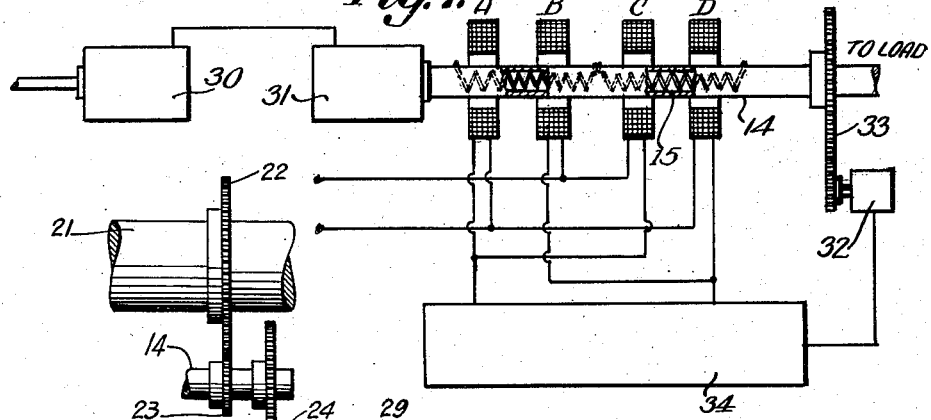
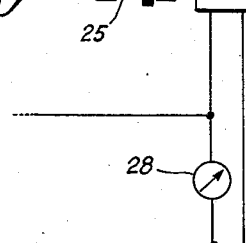
*Fig. 6.*
INVENTOR.
*Anton M. Feller,*
BY
*Edward L. Mueller*
ATTORNEY Patented Sept. 12, 1950

2,521,905

UNITED STATES PATENT OFFICE 2,521,905

TORQUE AND SPEED INDICATOR

Anton M. Felier, Rahway, N. J., assignor to Control Instrument Company, Inc., Brooklyn, N. Y., a corporation of New York Application February 14, 1945, Serial No. 577,795

5 Claims. (Cl. 73—136)

This invention relates to improvements in indicating systems and has particular reference to an apparatus for measuring magnetic changes produced by rotational forces.

It is known that, under the influence of internal stresses, certain magnetic materials display a relatively large change of magnetic permeability when subjected to a magnetizing field. In my co-pending application, now issued as Patent No. 2,461,635 dated February 15, 1949, there is disclosed a system for measuring forces by the use of magnetostrictive changes due to internal stresses chiefly in a longitudinal direction, producing the Villari effect.

A feature of the present invention is to accomplish, in an approved manner, the measurement of torque or speed, or both, when a magnetostrictive material is submitted, under the energizing influence of an alternating current field, to torsional or rotational stresses occasioned by centrifugal forces, the so-called Wertheim effect.

Another feature is to provide improved means for obtaining measurements which require a minimum of mechanical displacement and which are simple, rugged, and reliable.

The inventive idea involved is capable of receiving a variety of expressions some of which, for purposes of illustration, are shown in the accompanying drawings; but it is to be expressly understood that said drawings are employed merely to facilitate the description of the invention as a whole and not to define the limits thereof, reference being had to the appended claims for this purpose.

In the drawings—

Fig. 5 is a diagrammatic view illustrating the adaptation of the embodiment of Figs. 2 and 4, to main and auxiliary shafts for the measurement of transmitted torque and speed.

Figure 3:
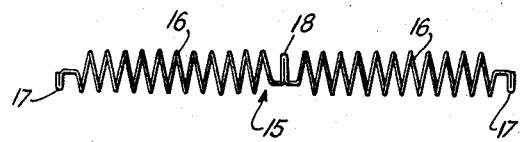
Fig. 3 is an elevation of the spring employed in Fig. 2.
Figure 2:
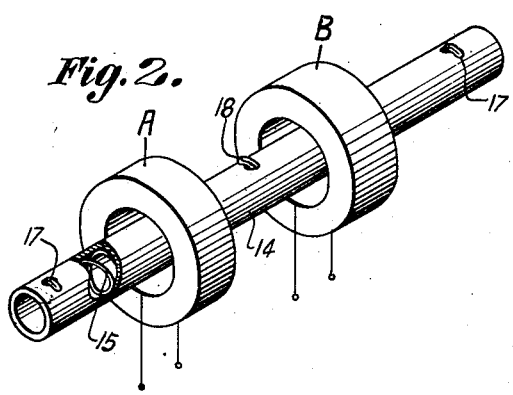
Fig. 2 is an isometric view showing another form in which a spring in the tubular core is utilized to produce initial torsional stresses in opposite directions.

Fig. 6 is a modified arrangement of the circuit shown in Fig. 5, in which is utilized the output of an alternating current generator as the input for the magnetostrictive torque-sensitive bridge circuit, and Fig. 7 is a diagrammatic view illustrating the adaptation of the principle of Figs. 2 and 3 to a Selsyn type follow-up, in which a torque-sensitive device is used to maintain synchronism of a servo system.

Figure 1:
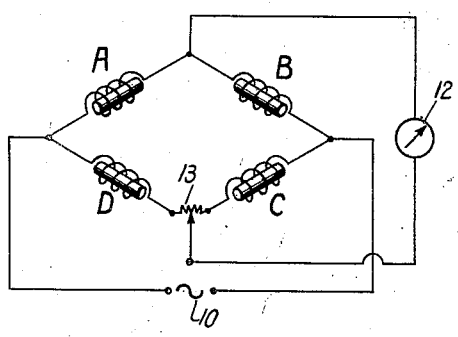
Fig. 1 is a diagrammatic view of a bridge circuit consisting of impedances normally balanced but in which one or more arms of the circuit are adapted to be varied by magnetostrictive influences.

In Fig. 1, wherein the basic principle of the invention is illustrated, there is shown a normally balanced bridge circuit including four inductive impedances A, B, C and D and energized by a source of alternating current. The core of one or more of the inductances is formed from a magnetostrictive material, such as nickel.

In the form shown in Figs. 2 and 3, the magnetostrictive element 14 is preloaded to produce initial stresses therein. This is accomplished by means of a helical spring 15, the two portions 16 of which are oppositely wound so as to produce torsional stresses of opposite sign in the material of the element 14. When positioned in place within the tube, said spring has its two extremities 17, and a medial point 18 thereof fixed to the tube 14, as shown in Fig. 3, and before being secured in such position the portions 16 are flexed in opposite directions so as to produce considerable initial stress in said tube. Due to this initial torque, any external torque applied to the tube will produce an increase of stress in one of the portions 16 and a decrease in the other. In this instance, two coils A and B adjoining arms of the bridge are employed to energize the element 14 because the change in admittance contributes to the unbalance of the bridge circuit, thereby increasing the sensitivity. It is obvious that arrangements wherein the spring 15 may be employed, limit the torque which can be measured to values dependent on the initial flexure of said spring and that external torque above said value will not contribute to further unbalance in the same direction, but will influence both bridge arms equally. This feature may be useful for certain special control purposes. By proper selection of materials and at suitable densities of magnetization, the effects can be made nearly linear with torque.

Figure 4:
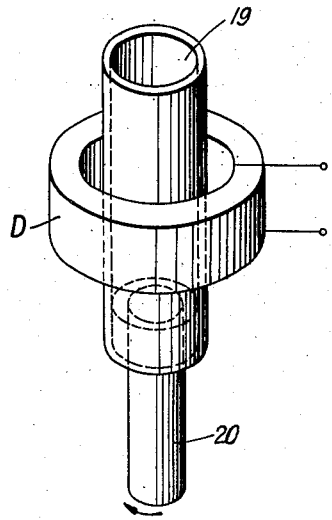
Fig. 4 is an isometric view of another form of the invention, showing a rotating tube of magnetic material which is adapted to be subjected to the simultaneous influence of centrifugal forces and the effect of an external alternating current field.

In the unit shown in Fig. 4, the magnetostrictive tube 19 may be energized by a single coil D, for example, of the bridge circuit and a driving member 20 may be inserted into one end of said tube to rotate the same. In this form, the tube 19 will show a change in permeability due to centrifugal forces and is therefore responsive to speed. It is assumed that the shaft 20 is substantially outside the magnetic field of the energizing coil D.

One example of the application of the basic principle herein involved, is shown in Fig. 5 wherein measurement of torque transmitted by a drive shaft and the speed of said shaft may be obtained. The total resulting unbalance produced indicates an integrated torque-speed relationship or, in other words, power. As shown, a main drive shaft 21 is geared at 22, to an auxiliary shaft 23 to which is suitably coupled a magnetostrictive element, such as the tube 14, and its associated spring 15 shown in Fig. 2. The auxiliary shaft 23 is connected, by gearing 24, to a shaft 25, coupled to a magnetostrictive element, such as the tube 19 shown in Fig. 4 which is energized by the single coil D, thus constituting a speed sensitive unit which is operated by the main shaft 21 that is geared up to a high value by the gearing 22 and 24. The interconnected bridge circuits are provided for the torque-sensitive and speed-sensitive sections and are supplied by an alternating current input connected to the terminals 26, there being indicators 27 and 28 in said circuits for the measurement of power and speed, respectively.

Integration of torque and speed for the purpose of determining power transmitted, may be better accomplished by the alternative means shown in Fig. 6. Here, the input voltage for operating the torque sensitive magnetostrictive bridge circuit may be derived from a small alternating current generator 29 on the shaft 25 in place of the element 19. The voltage output of said generator can be made proportional to the speed, and since the input voltage of the bridge circuit is proportional to speed, the unbalance output will be proportional to the power transmitted.

In Fig. 7, there is shown an adaptation of the principle herein involved to a Selsyn system consisting of a transmitter and receiver conventionally shown at 30 and 31, respectively, and a servomotor 32 coupled by gearing 33 to the receiver 31 through the intermediary of a pick-up including a magnetostrictive element 14 such as shown in Figs. 2 and 3. The adaptation of the invention illustrated in Fig. 7 is utilized to act as a coupling device between a transmitter of angular position such as, for example, a Selsyn device and a motor driving a load, without imparting an appreciable back-torque to the transmitter. Whenever the Selsyn devices 30 and 31 are not in synchronism the device 31 produces a torque acting on and through the element 14 to move the load. The Selsyn device of itself cannot produce sufficient torque, but its torque will stress the element 14 sufficiently to unbalance the output of the coils A, B, C and D. The resulting voltage, due to the unbalance, is amplified in the amplifier 34 and the output thereof is utilized to drive the motor 32 which motor, by means of the gears 33, drives both the load, and by way of element 14, the Selsyn device 31. When motor 32 has displaced both the load and the Selsyn device 31 so that the net torque applied to the element 14 is zero, the elements A, B, C and D will supply no voltage to the amplifier 34, the motor will cease to run, and the elements 30 and 31 will again be in synchronism. A greater degree of sensitivity may be obtained by extending the element 14 through all the energizing coils A, B, C and D, thereby subjecting all four arms of the bridge circuit to the magnetostrictive influences.

What is claimed is:

1. In a system for the measurement of forces, a normally balanced circuit including a plurality of inductances, a tubular magnetostrictive element forming a part of at least two of said inductances, an oppositely wound flexed spring within said tubular element having the extremities of its oppositely wound portions secured thereto, means to apply rotational stresses to said element to unbalance said circuit, and means to measure the amount of such unbalance.

2. In a system for the measurement of forces, a normally balanced circuit including a plurality of inductances, a magnetostrictive element forming part of at least two of said inductances, an oppositely wound flexed spring within said magnetostrictive element having the extremities of its oppositely wound portions secured thereto, and means to apply rotational stresses to said magnetostrictive element to unbalance said circuit.

3. In a system for the measurement of rotational forces, a normally balanced bridge circuit including a plurality of inductances, a magnetostrictive element forming a part of at least two of said inductances, means for preloading said magnetostrictive element including spring means for applying a turning moment in one direction to the mid-portion of said magnetostrictive element and turning moments in a direction opposed to said one direction to the ends of said magnetostrictive element, means to subject said element to rotational stress, and means to measure the magnitude and direction of the bridge unbalance introduced by said rotational forces.

4. In a system for the measurement of rotational forces, a normally balanced bridge circuit including a plurality of inductances, a hollow magnetostrictive element forming a part of at least two of said inductances, means for preloading said magnetostrictive element including spring means for applying a turning moment in one direction to the mid-portion of said magnetostrictive element and turning moments in a direction opposed to said one direction to the ends of said magnetostrictive element, means to subject said element to rotational stress, and means to measure the magnitude and direction of the bridge unbalance introduced by said rotational forces.

5. The combination of a torque transmitting shaft and a velocity transmitting shaft, a magnetostrictive element forming a part of said torque transmitting shaft, a pair of inductances associated with parts of said magnetostrictive element, means for preloading said magnetostrictive element including spring means for applying a turning moment in one direction to the mid-portion of said magnetostrictive elements and turning moment in a direction opposed to said one direction to the ends of said magnetostrictive element, a second magnetostrictive element driven by said velocity transmitting shaft, an inductance associated with said second magnetostrictive element, a balanced bridge circuit comprising a plurality of inductances associated with the last mentioned inductance and responsive to the velocity of its associated shaft, a second balanced bridge comprising a plurality of inductances associated with the first mentioned pair of inductances and responsive to the torque transmitted by its associated shaft, circuit means connecting the output of the first mentioned bridge to the input of the last mentioned bridge and indicating means associated with each of said bridge circuits to indicate the degree of unbalance therein.

ANTON M. FELLER.

REFERENCES CITED

The following references are of record in the file of this patent:

UNITED STATES PATENTS

| Number | Name | Date |
|---|---|---|
| 1,906,551 | De Forest | May 2, 1923 |
| 2,053,560 | Janovsky | Sept. 8, 1936 |
| 2,260,036 | Kuehni | Oct. 21, 1941 |
| 2,287,794 | Gunn | June 30, 1942 |
| 2,338,732 | Nosker | Jan. 11, 1944 |
| 2,365,073 | Haight | Dec. 12, 1944 |

FOREIGN PATENTS

| Number | Country | Date |
|---|---|---|
| 442,441 | Great Britain | Feb. 3, 1936 |
| 831,342 | France | June 7, 1938 |